United States Patent
Stenger et al.

(10) Patent No.: US 8,336,858 B2
(45) Date of Patent: Dec. 25, 2012

(54) PROTECTIVE TUBE, AUXILLIARY TOOL, SET COMPRISING AN AUXILIARY TOOL, A PIECE OF PROTECTIVE TUBE, AND A CLOSING ELEMENT, AND ARRANGEMENT COMPRISING A PROTECTIVE TUBE SUPPLY AND AN AUXILIARY TOOL

(75) Inventors: Markus Stenger, Hanau (DE); Dieter Fieber, Hainburg (DE)

(73) Assignee: Flexa GmbH & Co. Production und Vertrieb KG, Hanau (DE)

( * ) Notice: Subject to any disclaimer, the term of this patent is extended or adjusted under 35 U.S.C. 154(b) by 849 days.

(21) Appl. No.: 12/448,664

(22) PCT Filed: Dec. 11, 2007

(86) PCT No.: PCT/EP2007/010811
§ 371 (c)(1), (2), (4) Date: Jun. 29, 2009

(87) PCT Pub. No.: WO2008/080519
PCT Pub. Date: Jul. 10, 2008

(65) Prior Publication Data
US 2010/0065797 A1    Mar. 18, 2010

(30) Foreign Application Priority Data
Dec. 29, 2006 (DE) .......................... 10 2006 062 545

(51) Int. Cl.
*H02G 1/06* (2006.01)

(52) U.S. Cl. .......................... 254/134.3 R; 254/134.3 FT (58) Field of Classification Search ......... 254/134.3 FT, 254/134.3 R, 134.4
See application file for complete search history.

(56) References Cited

U.S. PATENT DOCUMENTS

| | | | | |
|---|---|---|---|---|
| 4,565,351 A | * | 1/1986 | Conti et al. | 254/134.3 FT |
| 5,261,887 A | * | 11/1993 | Walker | 604/161 |
| 5,918,337 A | * | 7/1999 | Evling et al. | 7/108 |
| 6,766,833 B1 | * | 7/2004 | Huang | 140/123 |
| 2004/0134559 A1 | * | 7/2004 | Huang | 140/123 |

FOREIGN PATENT DOCUMENTS

| | | |
|---|---|---|
| DE | 696 22 048 T2 | 4/1996 |
| DE | 200 13 481 U1 | 8/2000 |
| DE | 10 2004 005 307 B3 | 2/2004 |
| DE | 10 2004 005 310 B4 | 2/2004 |
| DE | 20 2004 009 048 U1 | 10/2004 |
| DE | 10 2004 005 306 B3 | 10/2005 |
| EP | 0 883 922 B1 | 4/1996 |
| EP | 0 790 210 A3 | 2/1997 |
| WO | WO 2005/123328 A3 | 12/2005 |

\* cited by examiner

*Primary Examiner* — Lee D Wilson
(74) *Attorney, Agent, or Firm* — Karl F. Milde, Jr.; Eckert Seamans Cherin & Mellott, LLC (57) ABSTRACT

A protective tube which is slit in the longitudinal direction is provided with a closing element that maintains the longitudinal edges along the slit on a plane relative to one another. The closing element is a separate profiled piece, of which the cross-section has such a shape that a central web of said profiled piece is inserted between the longitudinal edges of the tube. The top face of the tube is covered by the profiled piece along the longitudinal edges, and the internal faces of the tube are supported by the profiled piece. An auxiliary tool is provided for closing such a protective tube and inserting the closing element in the tube.

31 Claims, 9 Drawing Sheets

PROTECTIVE TUBE, AUXILLIARY TOOL, SET COMPRISING AN AUXILIARY TOOL, A PIECE OF PROTECTIVE TUBE, AND A CLOSING ELEMENT, AND ARRANGEMENT COMPRISING A PROTECTIVE TUBE SUPPLY AND AN AUXILIARY TOOL

BACKGROUND OF THE INVENTION

The present invention relates to a protective tube for shielding against the environment, an auxiliary tool, a set or kit with a protective tube and an auxiliary tool, and an arrangement with a protective tube supply and an auxiliary tool.

Protective tubes are used in the most different fields to protect, for instance, electrical or pneumatic lines and tubes against outside influences. Such protective tubes are also used to bundle a plurality of cables or individual wires. To give such protective tubes, which are normally made from plastics, a high stability, particularly regarding external influences, and to make them flexible at the same time, these are configured as so-called corrugated tubes. The diameters of said tubes may vary greatly and may normally range from a few millimeters to some ten millimeters or more.

To lay lines in such protective tubes, these must be drawn in from one end. If lines are to be laid over large distances in such protective tubes, it gets more and more difficult to draw in the cables with an increasing length, so that it is often imperative to use draw-in aids that are first of all threaded into the protective tube to subsequently fasten the cables and lines to be drawn in at the end, so that these can then be pulled with the draw-in aid through the protective tube. If other cables are to be added in a protective tube in which cables have already been drawn in, such a draw-in operation gets more and more difficult even if a draw-in aid is used. This is equally true when cables have already been laid, i.e. in the area of a computer workstation, which are later to be collected within a protective tube. That is also why protective tubes are offered that are longitudinally slit, so that these protective tubes can be opened to insert the cables subsequently. Most of the time the edges of the protective tube along the slit are sharp-edged so that said sharp edges may cause injuries if the edges are opened with the mere hand. The edges are also under such a tension that it is difficult to open the tube along the longitudinal slit. A further problem presented by such slit protective tubes manifests itself in that, after the tube has been opened, the edges are not always exactly adjoining one another aligned in one plane; it may e.g. happen that the one longitudinal edge slides over the other longitudinal edge, so that the diameter of the tube is also reduced. Moreover, the appearance is also deteriorated, e.g. whenever such protective tubes are used in visible areas, for example, to bundle the cables of a personal computer at a workplace.

DE 20 2004 009 048 U1 describes a simple, axially slit corrugated tube made of plastics for accommodating cables, wires, metal lines, or the like, in the case of which the slit is made wavelike. This wavelike configuration of the slit is to make sure that the cables or wires in bends are held in a much better way in the corrugated tube.

A protective tube for cables or a protective casing for cables in the form of a long plastic tube is described in DE 200 13 481 U1. In this protective tube the areas of the free edges are superposed, so that the protective tube is closed in the area of the slit without leaving a free gap.

DE 10 2004 005 310 B4 describes a corrugated tube as a protective sheath for electrical cables in automotive vehicles. Said corrugated tube comprises a slit extending throughout its length, as well as closing means for closing the same. The closing means are hook-like projections at the one edge along the slit that engage into matching projections at the other edge of the slit in that they grip over the respective other projections or come to rest thereunder. To close the tube along the slit, the hooking of the projections constitutes a troublesome operation.

DE 696 22 048 T2 (translation of EP 0 883 922 B1) describes a slit corrugated tube in the case of which a tongue or tab is provided along the slit on a longitudinal edge, the tongue or tab moving under the edge of the other longitudinal edge of the corrugated tube, so that position and orientation of the two longitudinal edges relative to each other are fixed. This document also indicates a method for producing such a corrugated tube by extrusion by way of chain or sheet extruders.

Since, as has already been described above, it is difficult to open a slit protective tube to insert cables therein, DE 200 13 481 U1, which has already been indicated above, provides an auxiliary tool as a lead-in clamp. Said lead-in clamp comprises two shaped parts, each consisting of a clamp mount and a clamp body, which are held by a clamp spring such that a cable guide cylinder can be opened against the pressure of the clamp spring to insert cables into the cable guide cylinder, and is re-closed by the pressure of the clamp spring and also kept closed. Furthermore, a guide member, called housing head, is provided, which adjoins the clamp body, and a constriction line along which the two edges of the cable protection housing are spread is formed between the clamp body and the housing guide head at both sides; the housing guide head is here extending through the interior of the cable protection housing and serves as a guide member. Simultaneously with the displacement of said auxiliary tool along the slit, cables can be inserted into the interior of the cable protection housing via the cable guide cylinder. The cable protection housing can be closed again behind the lead-in clamp. It is difficult to handle this lead-in clamp insofar as an exact guidance is not guaranteed all the time, and it may happen that the lead-in clamp jumps out of the slit; this may particularly be the case when cables that are quite thick are to be inserted into the cable protection housing. Furthermore, this system poses the problem that the edges along the slit of the cable protection housing come to rest one on top of the other in the closed position thereof, whereby different diameters of the cable protection casing may arise that depend, inter alia, on the plastic material used, the age of the cable protection housing and the quantity of the inserted cables.

SUMMARY OF THE INVENTION

It is the principal object of the present invention to provide a protective tube, an auxiliary tool for such a protective tube, a set as well as an arrangement, which use such a protective tube and such an auxiliary tool, for eliminating the above-described drawbacks in the prior art, wherein the edges of a slit protective tube, in particular, shall be safely held in alignment with one another, without the need for complicated constructional measures, also as far as the manufacturing process is concerned; the auxiliary tool shall facilitate the handling of such a protective tube, particularly a corrugated tube. The auxiliary tool shall also be useable within a transportable arrangement with which lines, cables, or the like, can be more easily drawn into a protective tube, also in great lengths, at the place of installation.

This object, and other objects which will become apparent from the discussion that follows, are achieved with a protective tube which is slit in longitudinal direction and is provided with a closing element that maintains the longitudinal edges along the slit on a plane relative to one another, characterized in that the closing element is a separate profiled piece, of which the cross-section has such a shape that a central web of said profiled piece is inserted between the longitudinal edges of the tube and the upper side of the tube is covered by the profiled piece along the longitudinal edges, and the inside of the tube is supported by the profiled piece.

Moreover, the object is achieved with respect to the auxiliary tool by such a tool that is suited for a protective tube slit in longitudinal direction to spread the longitudinal edges of such a protective tube along the slit and to close them again in abutment with one another, the auxiliary tool comprising two partial bodies which at their one longitudinal side are connected to a hinge member and between which a cavity or space is formed for guiding cables, lines, or the like, the partial bodies having to be opened and closed again along the hinge member, and comprising guide members provided on the outer surfaces of the partial bodies, with which the auxiliary tool can be displaced, guided along the longitudinal edges in the region of the slit of the protective tube, characterized in that the guide members are arranged on the free longitudinal edges opposite the hinge member, and that the region of the cavity between the partial bodies has arranged therein guide elements which, viewed in a projection onto the outside of the partial bodies, extend from the one end of the partial bodies at an angle to the guide members on the outside of the partial bodies and end approximately in the plane of said guide members at the other end of the partial bodies.

Finally, the invention must be seen in a set consisting of a protective tube with profiled piece and an auxiliary tool.

Furthermore, the object is achieved through an arrangement comprising a protective tube supply and an auxiliary tool, characterized in that the auxiliary tool is fixedly mounted on a work platform, that guide elements are arranged on the work platform to move a protective tube towards and away from the auxiliary tool, with supply units at the inlet side of the auxiliary tool for protective tube, for cables, lines, or the like, to be introduced into the protective tube, and for the profiled piece.

It is essential that the protective tube is closed along the slit by a profiled piece inserted between the longitudinal edges of the tube along the slit. With this profiled piece the longitudinal edges are fixed in their orientation relative to one another. Such a profiled piece can be used for protective tubes of different diameters that are slit in longitudinal direction; such a profiled piece may also be produced as an endless piece to be then cut to the respectively needed length.

Such a closing element or profiled piece may be configured, when viewed in cross section, in the shape of a double "U" or a double "T". A central web of said profile comes to rest between the longitudinal edges, and the upper side of the tube is covered along the longitudinal edges by respective surface elements of the profile, and the inside of the tube is also supported along the longitudinal edges by corresponding surface elements of the profile. Moreover, the closing element or profiled piece, when viewed in cross section, may be configured by two round members that are interconnected via a web. The web of this profile then comes to rest between the longitudinal edges of the protective tube; the upper side of the tube along the longitudinal edges is covered by the one bead of the profile and the inside of the tube along the longitudinal edges is supported by the other bead of the profile. Such a profiled piece is also suited for use with protective tubes slit in longitudinal direction, particularly corrugated tubes.

To configure such a profiled piece for multiple applications, i.e. particularly for use with protective tubes of different diameters, the free legs of the profiled piece adjoining the inside of the protective tube, e.g. when the profiled piece or closing element is configured as a double "U" or double "T" when viewed in cross-section should have a curvature with a radius of curvature which is smaller than the radius of curvature of the inside of the protective tube. By contrast, the free legs of the profiled piece resting on the outside of the protective tube can be configured as straight surface members. To enable the free legs lying on the outside of the protective tube to rest substantially flat on the protective tube, the free legs of the profiled piece may have a curvature with a radius of curvature approximately identical with the radius of curvature of the outside of the protective tube. It goes without saying that the free legs of the profiled piece that are positioned in the area of the outside of the protective tube can be adapted in their curvature to the outside of the protective tube, so that they come to lie flat on the outside.

The closing element may be made from a colored plastic material having a color matching that of the protective tube, so that said closing element is integrated into the protective tube in an inconspicuous way. However, to make the closing element variable for the different color variants of protective tubes, a colorless, flexible plastic material is preferred, so that the colors of the protective tube can be seen through the parts of the profiled element, and the profiled element thereby so to speak adopts the color of the protective tube. To make the profiled element flexible, so that it easily fits into the slit between the longitudinal edges of the protective tube, the closing element should be made from polyurethane (PU), polypropylene (PP), polyamide (PA), polyethylene (PE) or also polyvinylchloride (PVC).

The aforementioned auxiliary tool is suitably of such a structure that on the one hand the above-explained profiled element can be inserted between the longitudinal edges of the slit protective tube and that on the other hand cables, lines, or the like, can be introduced into the protective tube at the same time. The guide members on the outside of the partial bodies that safely guide the auxiliary tool during displacement along the longitudinal slit of the protective tube on the edges are of essential importance in said tool. At the same time the guide elements in the area of the cavity between the partial bodies serve to guide the connection element or profiled piece between the longitudinal edges of the protective tube and to exactly insert it at said place. Finally, the cavity is used to introduce cables into the interior of the protective tube in the same operation during which the profiled element is inserted into the longitudinal slit.

Viewed from the top, the partial bodies may have a triangular or trapezoidal shape. The tapering end is the region on which the auxiliary tool enters or is threaded in between the longitudinal edges of the protective tube, while the opposite side provides enough space for supplying the cables and the profiled piece, separated from one another.

At the tapering end of the partial bodies, the guide members and the guide elements should end in one plane.

Preferably, the guide members and/or guide elements are formed by webs.

At least two webs of each guide member may each be arranged such that a U-shaped trough is formed.

To guide the edges of the protective tube over the whole auxiliary tool, the guide members should extend from the one end up to the other end of the partial bodies.

The guide elements in the area of the cavity are configured for guiding a closing element (welting) to be inserted between the longitudinal edges of the protective tube, i.e. they are adapted to the profile of the closing element.

To ensure an appropriate distance between the two partial bodies, a respective web is arranged on the inside of each partial body and is of such a height that the free edges of the opposite webs abut on each other.

Furthermore, a web arranged on the inside of each partial body may be of such a height that a space is formed between the free edges of the opposite webs; a corresponding closing element or profiled piece may then be inserted between said two webs and into the space, respectively.

To keep the friction small between the auxiliary tool and the longitudinal edges of the protective tube, the bottom area of the U-shaped trough should comprise wavelike projections on the outside of the partial bodies in which the longitudinal edge of the protective tube extends.

The hinge connecting the two partial bodies may preferably be configured as a film hinge when the auxiliary tool is made from a plastic material; along said hinge the two partial bodies can be unfolded so as to insert, for instance, a cable or a cable bundle into the cavity for introducing the same into the protective tube.

The hinge may be configured as a double film hinge.

The auxiliary tool, a piece of tube and a length of the profiled piece corresponding to the piece of tube may be packed to form a sales unit; in addition, operating instructions for handling the auxiliary tool may be attached to this set.

The requirement is often made that lines and cables should be laid in protective tubes for covering long distances. To insert said lines and cables, an arrangement with a protective tube supply and with an auxiliary tool, as described above, can be used in situ; such an arrangement comprises a work platform or a similar holding arrangement on which the auxiliary tool is fixedly mounted. Guide members are arranged on the work platform to move the protective tube towards and away from the auxiliary tool. Furthermore, supply units are provided at the inlet side of the auxiliary tool for protective tube, for cables, lines, or the like, to be introduced into the protective tube, and for the profiled piece. After the necessary length of the lines and cables has been introduced into the protective tube and the protective tube has been closed with the profiled piece, this customized tube length is cut off and the next piece is customized. For the determination of the length of the protective tube a corresponding counting mechanism may be provided.

The supply units can be arranged one on top of the other such that the cables, lines, or the like, are supplied above the protective tube, and the profiled piece is supplied above the cables, lines, or the like.

The supply units may be formed by supply rolls.

To prepare the customized protective tube for the laying operation, a take-up roll for the protective tube with the drawn-in cables, lines, or the like, may be arranged at the outlet side of the work platform, with the protective tube being wound onto said roll in the customized condition.

The supply units and/or supply rolls may be held in racks. It is essential that a protective tube slit in longitudinal direction is inserted and is closed with a closing element after insertion of the cables and lines. To permit also the use of an unslit protective tube as a start material, a slitting device may be provided at the input side of the auxiliary tool for slitting the unslit protective tube in longitudinal direction before said tube is supplied to the auxiliary tool. A stationary knife may be used as the slitting device, the knife being e.g. secured to the work platform on which the auxiliary tool is also mounted.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-7 of the drawings. Identical elements in the various figures are designated with the same reference numerals.

Figure 1:
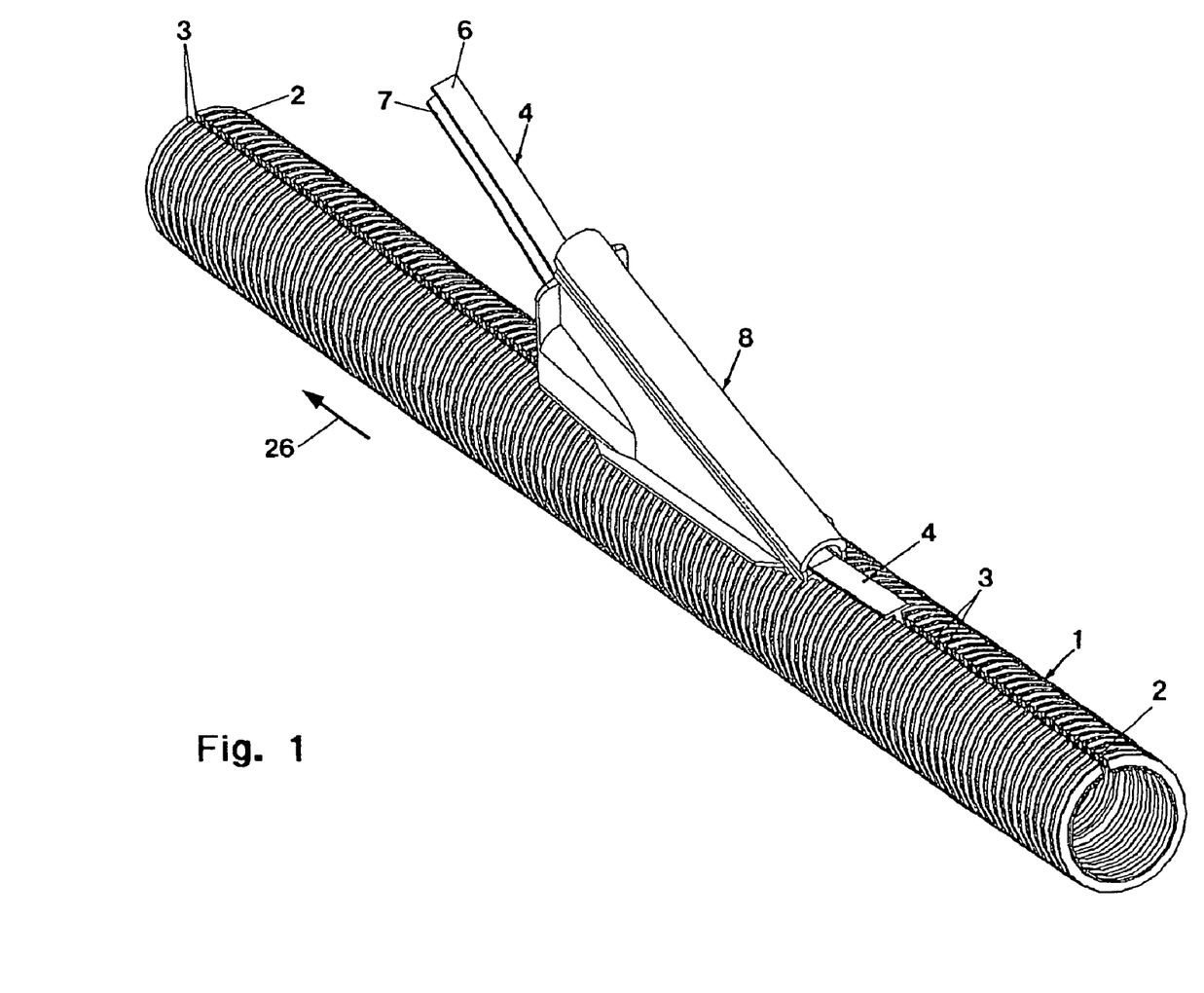
FIG. 1 is a perspective view of a section of a corrugated tube which is slit in longitudinal direction, comprising an auxiliary tool with which a profiled piece is in the process of being inserted into the longitudinal slit.
Figure 2:
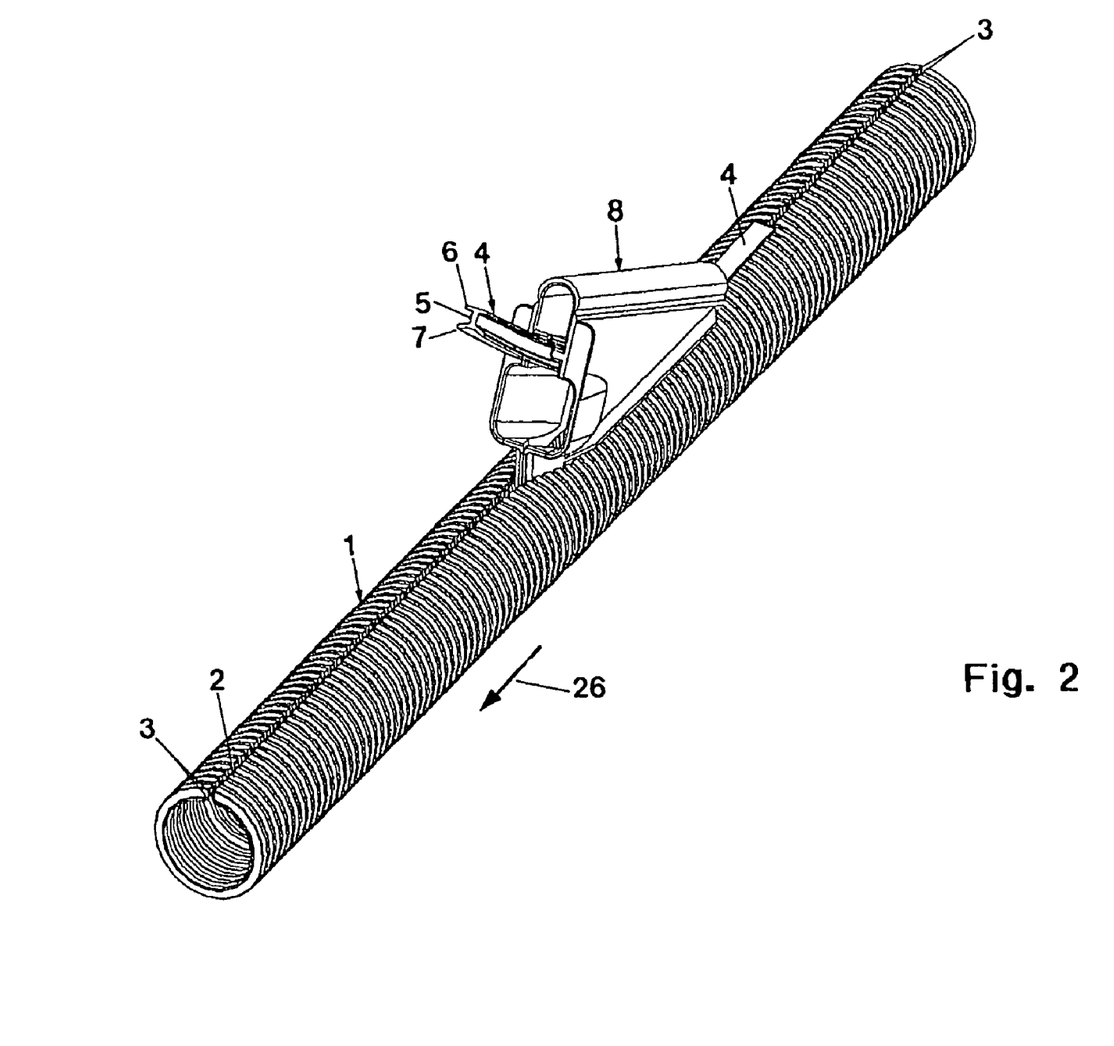
FIG. 2 is the view of FIG. 1, but viewed from the other side of the auxiliary tools.

The protective tube 1 shown in FIGS. 1 and 2, which is a standard corrugated tube of plastics, is slit in longitudinal direction. In the region of the slit 2, this yields two opposite longitudinal edges 3, which are substantially oriented in a plane relative to each other. To fix the two longitudinal edges 3, oriented in one plane, and to re-close the protective tube 1 along the slit 2, a closing element 4 or profiled piece is inserted into the slit 2. Viewed in cross section, as can particularly be seen at the end of the closing element 4 in FIG. 2 and the illustration of said profiled piece in FIG. 5a, said profiled piece has a so-called double T-shape or double U-shape, with a central web 5 and with two upper surface elements 6 and two lower surface elements 7 extending at an approximately right angle therefrom. The central web 5 of said closing element 4 settles between the two longitudinal edges 3 of the protective tube 1, while the two upper surface elements 6 cover the upper edge portion of the protective tube 1 along the longitudinal edges 3 and the lower surface elements 7 support the region of the protective tube 1 along the longitudinal edges 3. The two longitudinal edges 3 of the protective tube are thereby fixed in their position whenever the closing element 4 is inserted in the slits 2.

As can be seen from the section through the closing element 4 in FIG. 2, the two lower surface elements 6 are configured to be slightly arcuate when viewed in cross section, the radius of the curvature of the two lower surface elements 7 being smaller than the inner radius of the protective tube 1, so that the opening width of the groove between the upper surface element 6, the lower surface element 7 and the central web 5 is correspondingly larger than the wall thickness of the protective tube 1 in the region of the slit 2. As a result, the closing element 4 can be inserted into the slit without getting jammed on the longitudinal edges 3 of the protective tube 1.

Preferably, the profiled element is made from a soft, substantially flexible material, so that the closing element 4 can adjust itself to the longitudinal edges 3 of the protective tube 1. Preferably, the closing element 4 is made from polypropylene (PP). The closing element 4 may be colored, so that its color can be matched to the color of the protective tube 1; however, it is also possible to make this closing element 4 from a colorless and slightly transparent material, so that the basic color of the protective tube 1 shines through the closing element 4 and is thus relatively inconspicuous.

The act of inserting such a closing element 4 into the slit 2 may be difficult for the reason that such protective tubes or corrugated tubes 1 are normally made from a firm material that is made flexible through the wavelike configuration for laying the tube also in bends. Moreover, the edges of such a tube 1 are sharp-edged and tend to cause injuries if such a closing element 4 is inserted without the aid of tools into the slit 2. That is why, as can be seen in FIGS. 1 and 2, an auxiliary tool 8 is used that is shown on an enlarged scale in FIG. 3A and in a flat-spread condition, with a view on the top side, in FIG. 4.

The auxiliary tool 8 is composed of two partial bodies 9, which are connected via an upper connecting member 10. The two partial bodies 9 of the auxiliary tool 8, which are made from plastics, are each connected to the left and right partial body 9 via a film hinge 11, so that the two partial bodies 9 can be pivoted from a position shown in FIG. 4, in which they are injection-molded from plastics, to the position shown in FIG. 3A.

Figure 4:
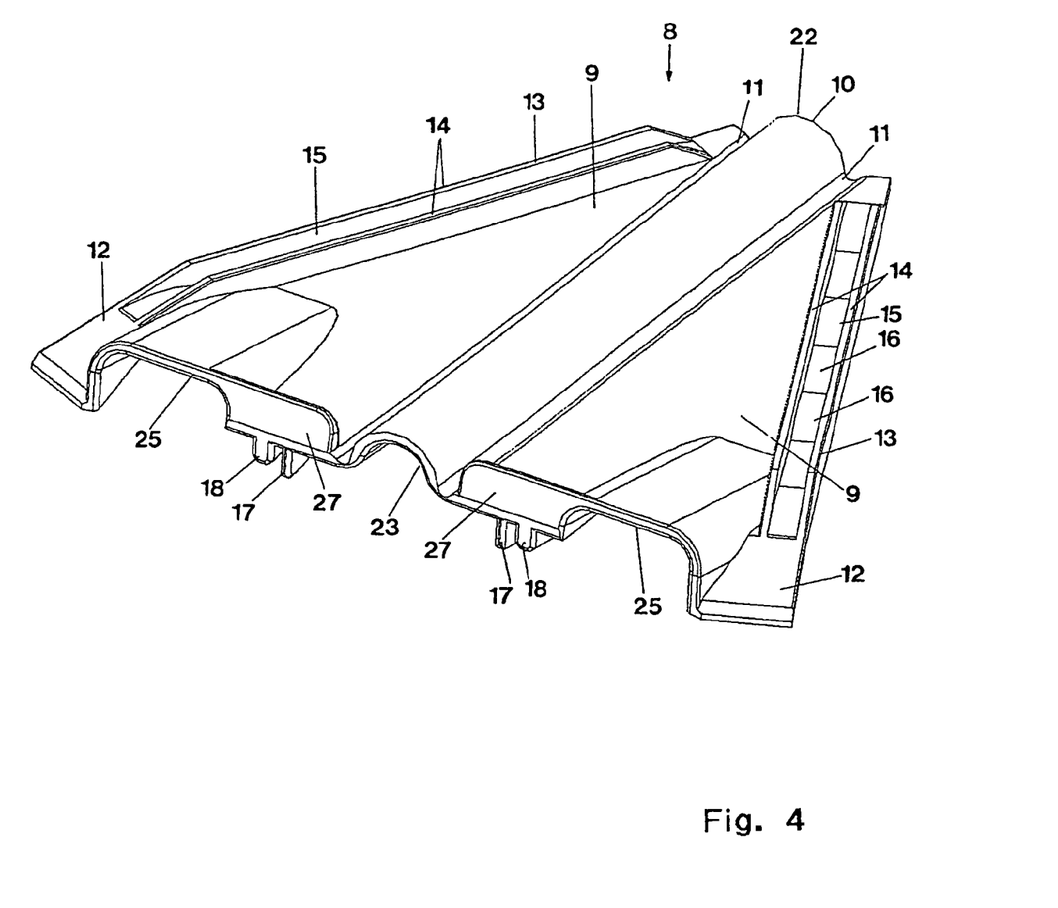
FIG. 4 shows the auxiliary tool, as can be seen in FIGS. 1, 2 and 3A, in a perspective view in an unfolded state with a view onto the outside.

When viewed from above, as can be seen in FIG. 4, the two partial bodies 9 have an approximately triangular basic shape. Along the lower edge 12 of each partial body 9 guide members are located that are generally designated by reference numeral 12 and consist of two webs 14 arranged in parallel with and spaced apart from each other. A groove 15 is formed between said two webs 14, the groove 15 being dimensioned such that the longitudinal edge of the protective tube 1 can each time be guided therein, as shown in FIGS. 1 and 2. The front end and the rear end of said guide members 13 and of the webs 14, respectively, are slanted to facilitate the introduction of the longitudinal edges 3 of the protective tube 1. The bottom surface of the groove 15 has formed thereon projections 16 extending in wavelike fashion, which serve to reduce the friction of the longitudinal edges 3 of the protective tube 1 on the bottom surface of the groove 15.

Figure 3A:
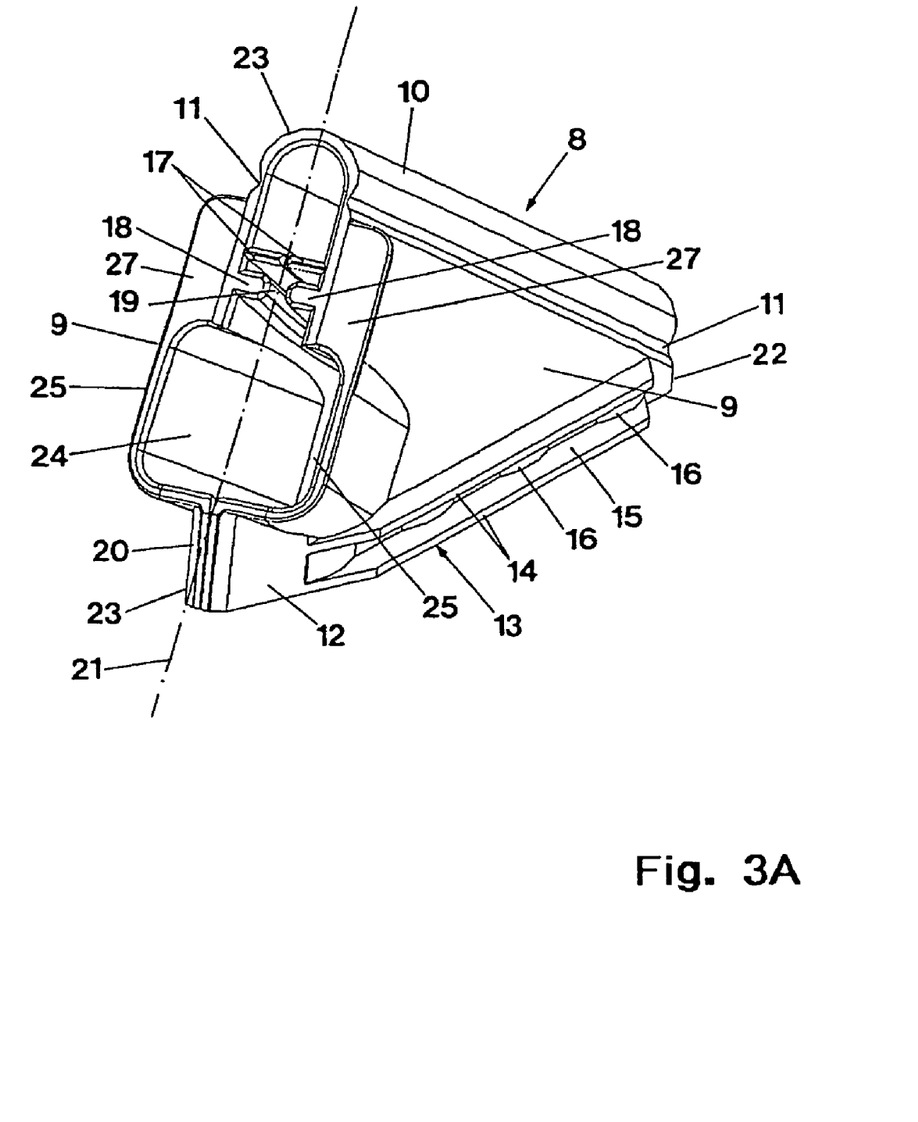
FIG. 3A is a perspective view of the auxiliary tool from the introduction side.

On the inside of the partial bodies 9, a first web 17 and a second web 18 are located in the upper region, each in opposing fashion. Starting from the base area of the partial body 9, the webs 17 have such a length or height that they abut on each other. By contrast, the two second webs 18 have such a height that a clearance or gap 19 remains between the two webs. Furthermore, the two rear end sections 20 are bent inwards such that they meet each other at their end along the partition line of said auxiliary tool, which is designated by reference numeral 21. While the two rear end sections 20 abut on each other with their ends, the peripheral portions of the partial bodies 9, on which the respective guide members 13 are positioned on the outside, are spaced apart from each other on the inside. This spacing is identical with the spacing that is also defined by the two first webs 17 in the upper region. It should be noted that both the first webs 17 and the second webs 18 extend up to the rear end 22 and, starting from the front end 23 as can be seen in FIG. 3A, extend in arcuate fashion downwards in a curved configuration, as can clearly be seen in conjunction with FIGS. 1 and 2.

The second webs 18 have positioned underneath a cavity, or an enlarged area 24, which is formed by two bulges 25 on each of the partial bodies 9. Said enlarged area 24 serves as an inlet port or inlet funnel to let cables, wires, lines, or the like, which are to be drawn into the corrugated tube 1, pass into said auxiliary tool 8. In the top view, the enlarged area 24 is made rectangular; however, it may also have a round or oval shape, depending on the question for which cross-sections of a fiber bundle the auxiliary tool 8 is to be used.

As shown in FIGS. 1 and 2, the auxiliary tool 8 serves to open the corrugated tube 1 along the slit 2 so as to introduce a cable bundle into the protective tube 1, and also serves to re-close said slit 2 in a subsequent step with a closing element 4, which has already been explained above. For this process the auxiliary tool is inserted with its front end 23, namely at said place with the two tapering rear end sections 20, into the slit 2 of a protective tube 1. Due to the wedge-shaped enlargement of the rear end sections 20 the longitudinal edges 3 of the protective tube 1 are pressed apart along the slit 2 and are then introduced into the two grooves 15 between the webs 14, and the tube 1 is sliding with the longitudinal edges 3 on the wavelike projections 16. After the auxiliary tool 8 has then been inserted into the slit 2 of the protective tube 1 in such a way that the guide members 13 are fully held between the longitudinal edges 3 of the protective tube 1, the closing element 4 is introduced between the second webs 18 underneath the first webs 17, so that the central web 5 of the closing element 4 runs in the gap 19 between the second webs 18. The closing element 4 is then shifted further into the auxiliary tool 8 until it exits at the rear end 22, while being guided by the webs 17 and 18. At this rear end 22 the webs 17, 18 extend approximately in the plane of the outer guide members 13, so that the closing element 4 is introduced between the longitudinal edges 3 of the protective tube into the slit 2. This operative position of the protective tube 1, the auxiliary tool 8, and the closing element 4 is shown in FIGS. 1 and 2. The cables (not shown in more detail), which are to be introduced into the protective tube, are now inserted into the enlarged area 24 as a bundle, or also individually, and advanced for a specific length into the protective tube 1. The auxiliary tool 8 can now be drawn into the slit 2 along the protective tube 1, as illustrated by the directional arrow 26 in FIGS. 1 and 2. During this process the cable bundle enters the enlarged area 24 on the one end and the closing element 4 is inserted into the slit 2 of the protective tube 1 behind the auxiliary tool 8 on the other end. At the end of the protective tube 1 the auxiliary tool 8 is withdrawn from the slit 2 and the closing element 4 is cut off in conformity with the length of the protective tube 1.

To facilitate the process of drawing the auxiliary tool 8 along the slit 2, two grip tabs 27 are provided at the front end 23, the tabs being surface elements that vertically protrude from the outside of the partial bodies 9 on the edge of said partial bodies 9 and pass downwards into the outer contour of the bulges 25.

The auxiliary tool 8 can also be handled such that for the insertion of cable bundles into the enlarged area 24 the two partial bodies 9 are folded apart around the film hinges 11 on the upper connection member 10.

As can be seen in FIG. 4, the auxiliary tool 8 can be made from plastics with a simple injection-molding tool and can thus be an inexpensive auxiliary tool. That is why a set can also be marketed at low costs, the set being made up of a length of a protective tube 1, a corresponding length of a closing element 4, of such an auxiliary tool 8 and of operating instructions for handling the auxiliary tool 8.

Along the lower edge on which the guide members 13 are positioned, the auxiliary tool 8 has about a length of about 80 to 100 millimeters, a height at the front end 23 of about 50 millimeters, and the opening width of the enlarged area 24 is about 20 millimeters. The width of the groove 15 should be about 2 to 4 millimeters; at any rate, the grooves 15 should have such a width that they can accommodate wall thicknesses of protective tubes 1 (or corrugates tubes), at which the auxiliary tool 8 is to be used, without getting wedged therein. The webs 14 should also have such a height that the longitudinal edges 3 of a protective tube 1 are safely guided in the groove 15.

Figure 3B:
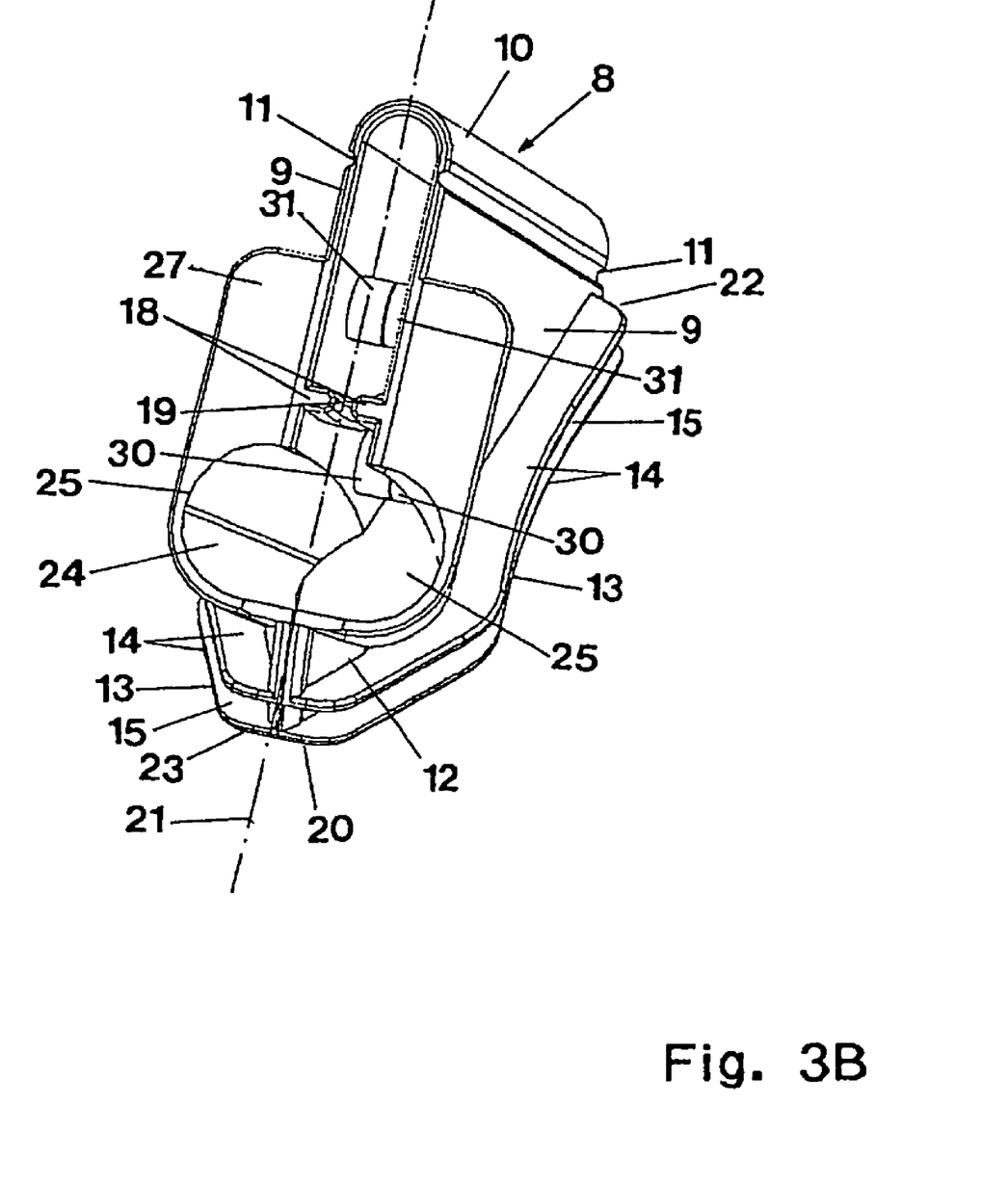
FIG. 3B is a perspective view of a further auxiliary tool from the introduction side.
Figure 5A:
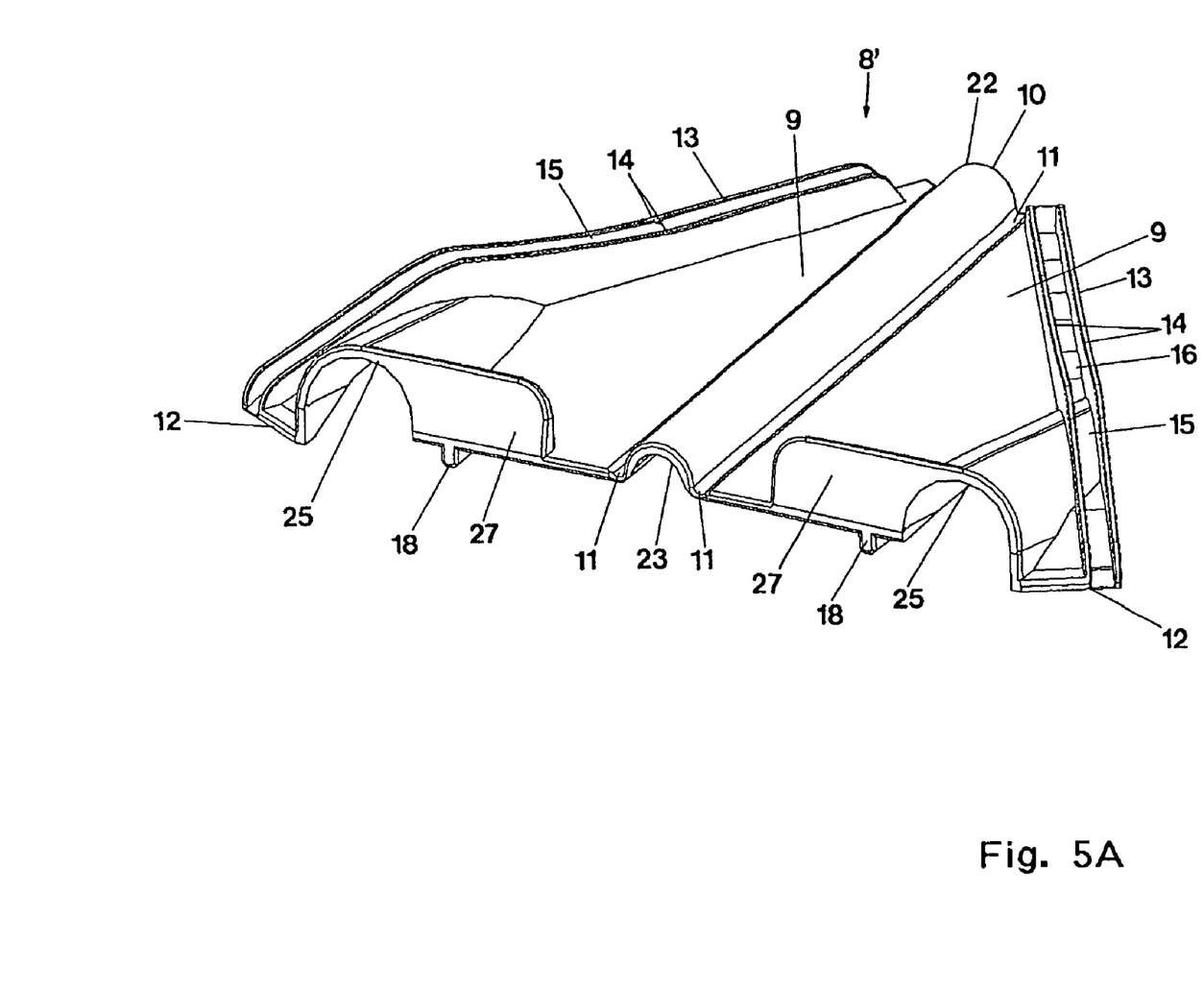
FIG. 5A shows the auxiliary tool, as can be seen in FIG. 3B, in a perspective view in an unfolded state with a view onto the outside.
Figure 5B:
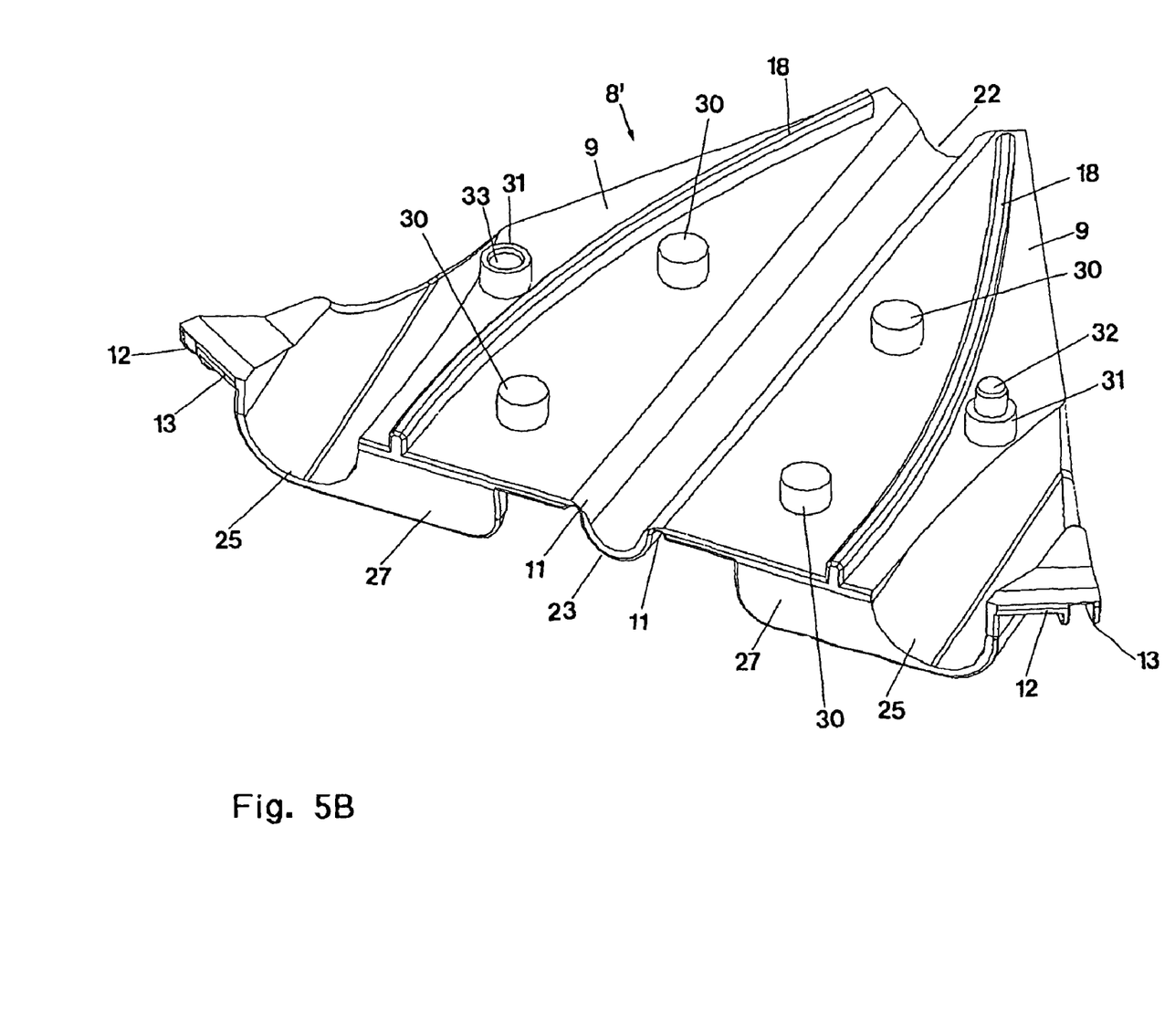
FIG. 5B shows the auxiliary tool of FIG. 3B in an unfolded state according to FIG. 5A, but with a view onto the inside.

FIGS. 3B and 5A and 5B show a further embodiment of an auxiliary tool, designated by reference numeral 8'.

While the auxiliary tool 8, as shown in FIG. 3A, has an enlarged area 24 of square or rectangular cross-section, said enlarged area 24 in the embodiment of FIG. 3B of the auxiliary tool 8' is made oval, with the largest width of said cross-section being oriented in a direction perpendicular to the partition line 21. Such a cross-sectional shape enables the introduction of several lines side by side into the auxiliary tool 8'.

Furthermore, only the second webs 18 are provided in the auxiliary tool 8' while the first webs 17, as provided in the auxiliary tool 8 of FIG. 3A, are missing in this embodiment. The second webs 18, in turn, are positioned such that a gap 19 is formed thereinbetween so as to guide the central web 5 of a closing element 4 in the gap.

To keep the two webs 18 spaced apart such that a uniform gap 19 is formed between the ends thereof, spacers 30 and 31 are provided on the inner surfaces of the partial bodies 9, as shown in FIG. 5B. Two respective spacers of such type are arranged on each partial body 9 between the second web 18 and the respective film hinge 11 in such a way that, when the two partial bodies 9 are placed on each other by the bodies being pivoted around the film hinges 11, the end faces of the spacers 30 are positioned on each other. The two spacers 31, which are arranged on the surface of the partial body 9 that lies outside relative to the second web, have a peg 32 on the one hand and a hole 33 on the other hand, so that said two spacers 31, in which the peg 32 engages into the hole 33, additionally center the two partial bodies 9.

Furthermore, in the auxiliary tool 8' the guide members 13 are formed starting from the front end 23 up to the rear end 22 of the partial bodies 9. Hence, the total length of the partial bodies is used for guiding the longitudinal edges 3 of a protective tube 1 in the grooves 15. To spread apart the slit of a protective tube to a sufficient degree and thereby to open the same, so that the whole cross-sectional width of the enlarged area 24 can be used for introducing cables and lines into the protective tube, the guide members 13 first extend obliquely outwards while reducing their distance from each other again towards the rear end 22. The largest distance between the two opposing grooves 15 is observed at about a third of the length of the grooves 15.

The closing element or profiled piece 4 should have such a cross-sectional shape that it is safely held in the slit of the protective tube 1 with its upper surface elements 6 and its lower surface elements 7. It has been found in practice that such a closing element 4 is also securely held in the slit 2 when the protective tube 1 is rotated about its axis or, however, placed in narrow radii. Moreover, the closing element 4 can be removed again from the slit 2 at any time and then be inserted again into the slit 2 of a protective tube 1 with the help of the auxiliary tool 8.

Figure 6:
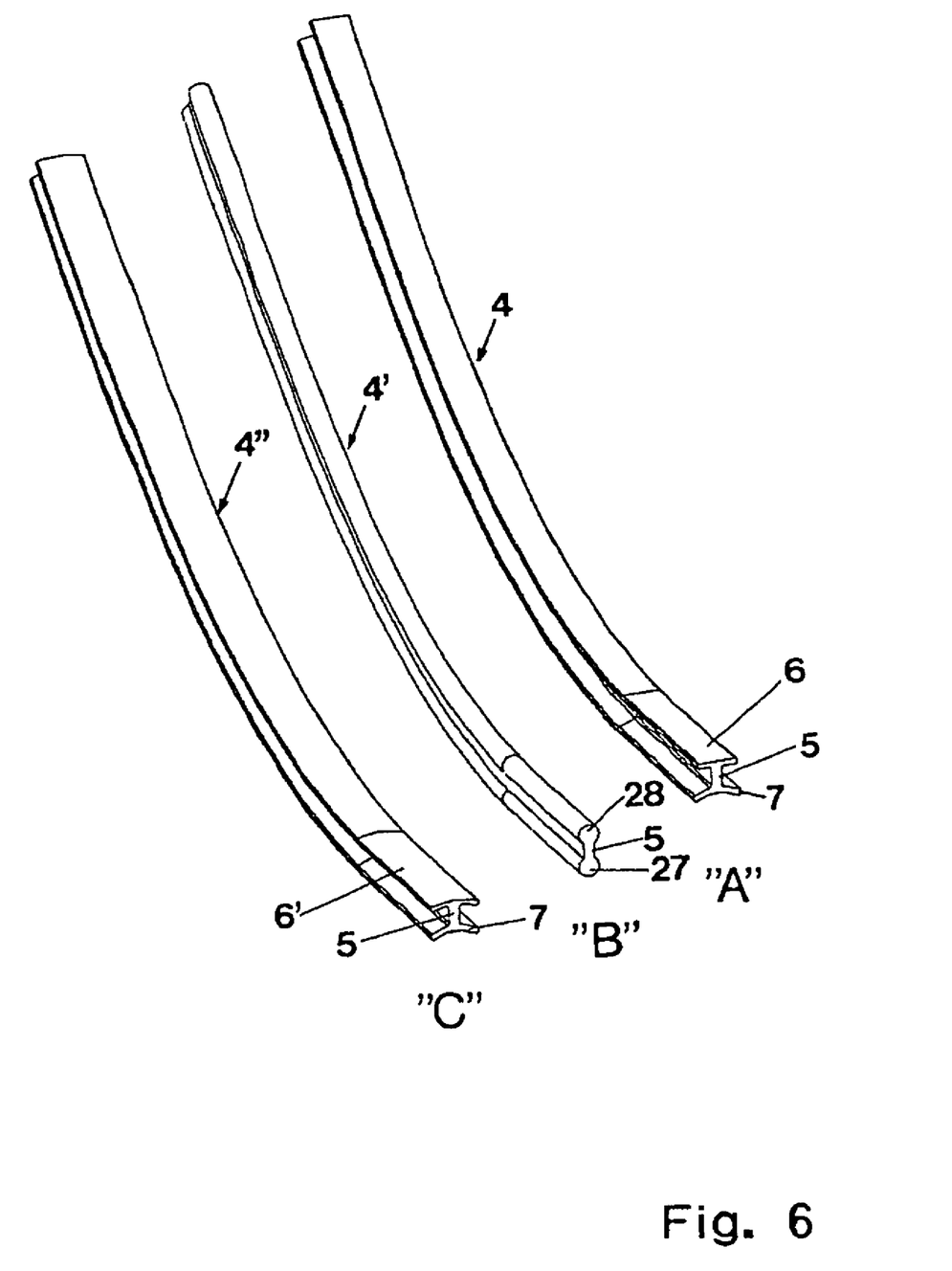
FIG. 6 shows three different profiled pieces, called A, B, and C, as can be used for closing the protective tube, the profiled piece A corresponding to the one as can be seen in FIGS. 1 and 2.

FIG. 6 shows the three different views A, B and C of three different profiled pieces 4, 4' and 4", with the profiled piece 4 according to view A being the one that can also be seen in FIGS. 1 and 2.

The profiled piece 4' according to view B shows a cross-sectional shape of the profiled piece that instead of the upper surface elements 6 and the lower surface elements 7 of the profiled piece 4 of FIG. 6, view A, shows an upper bead 28 and a lower bead 29. Said beads 28, 29 then adjoin the upper side and the lower side of the protective tube 1 along the longitudinal edges 3 in the area of the slit 2 so as to close the slit 2. Depending on the thickness of the upper bead 28, it may be necessary to modify the webs 17 and 18 on the inside of the partial bodies 9 of the auxiliary tool 8 in such a way that said profiled piece 4' is guided in the auxiliary tool 8 in an easily sliding way.

The profiled piece 4" according to view C is comparable in its cross-sectional profile with that of the profiled piece 4 according to view A, but the upper surface elements 6' (free legs) are also shaped in arcuate fashion, so that said surface elements 6' match the curvature of the outer periphery of a protective tube. However, with this type of profiled piece 4", the height of the web 5 must be adapted to the wall thickness of the protective tube while the embodiment according to view A permits a certain tolerance in the wall thickness of the protective tube.

The profiled piece 4, as can be seen in FIG. 6, view A, has a width along the upper surface elements 6 of about 4 to 10 millimeters, while the web has a height of 2 to 7 millimeters, depending on the wall thickness of the protective tube 1.

The beads 28 and 29 of the profiled piece 4', as shown in FIG. 6, view B, have a diameter of 3 to 6 millimeters. It is clear that the profiled shapes, as shown in FIGS. 5A and 5B, can be combined; for instance, the bead 29, as shown in FIG. 6, view B, can be used instead of the lower surface elements 7 of the profiled piece 4 in FIG. 6, view A.

The dimensions of the profiled pieces 4' and 4" are comparable with those indicated above with reference to the profiled piece 4.

Figure 7:
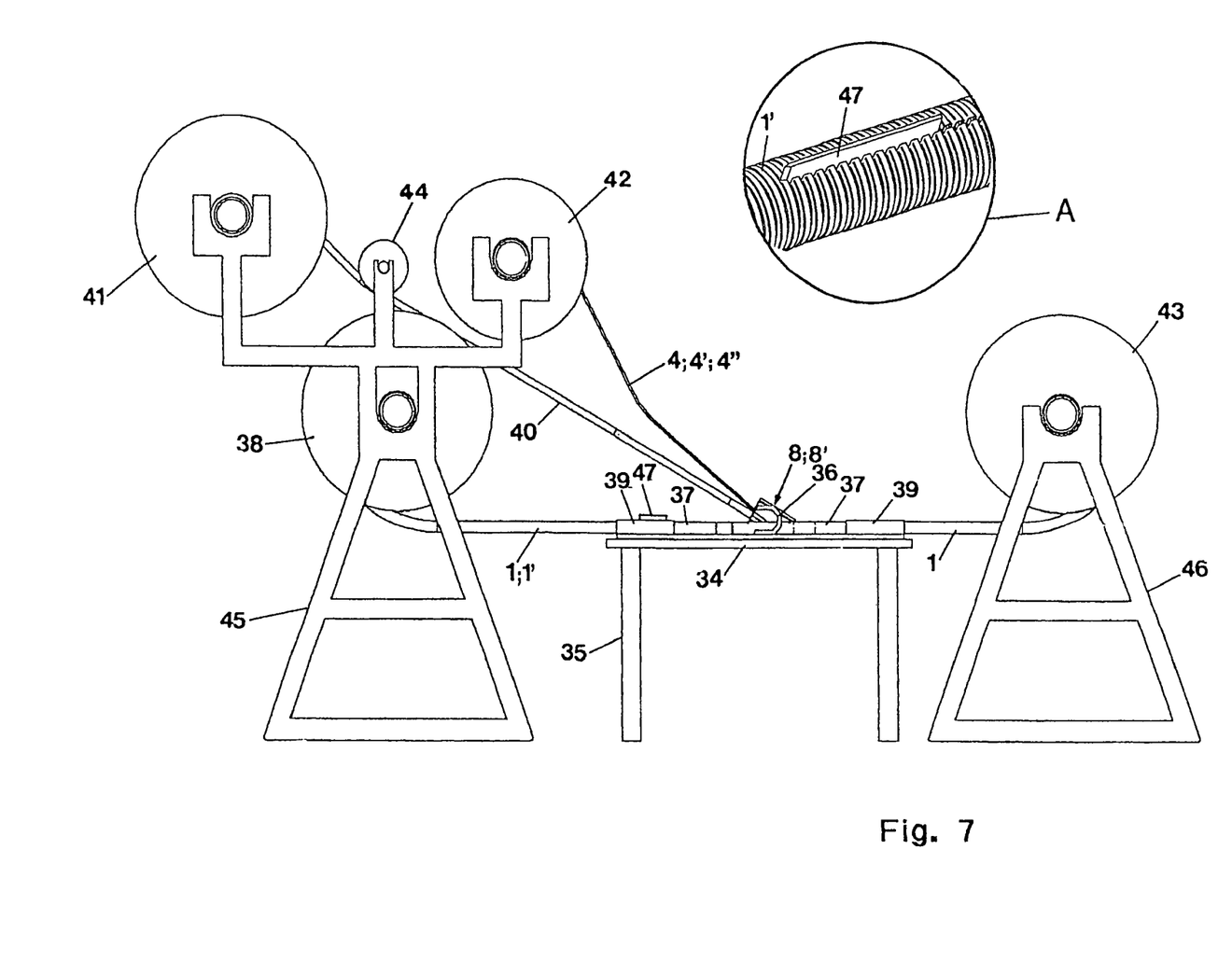
FIG. 7 is a lateral view of a schematically illustrated arrangement to draw cables, lines, or the like, into protective tubes in a semi-automated way, where detail "A" shows, on an enlarged scale, an arrangement for slitting an unslit protective tube.

FIG. 7 shows an arrangement for drawing cables, lines, or the like, into protective tubes in a semi-automated way. This arrangement uses an auxiliary tool 8 or 8', as has been explained above. This auxiliary tool, however, is stationarily arranged on a work platform 34, which is part of a table 35. The auxiliary tool 8 (or 8') is not directly mounted on the work platform 34, but held by means of lateral holders 36 above guide elements 37, which form a U-shaped trough. A protective tube 1 which is stored on a supply roll 38 is fed into said U-shaped trough at the inlet side. The protective tube 1 is then spread on the auxiliary tool 8 along its slit 2, so that cables or lines 40, which are stored on a further supply roll 41, can be supplied via the enlarged area of the auxiliary tool 8. Above said cables and lines 40 a closing element/profiled piece 4, stored on a supply roll 42, is supplied so as to insert said closing element 4 between the longitudinal edges 3 of the protective tube 1 so as to close the slit 2. The customized protective tube 1 with the cables and lines introduced thereinto and closed with the closing element 4 can then be wound onto a take-up roll 43 or they may also be laid directly in situ. The guide elements 37 can be covered at the beginning and at the end of the work platform 34 by a covering element 39, so that the protective tube 1 is safely guided in front of and behind the auxiliary tool 8. The supply rolls 38, 41, 42 are held at the inlet side of the work platform 34 on a rack 45 and are possibly guided by additional guide rolls 44. This is also true of the take-up roll 43, which can also be held on an appropriate rack 46.

A slit protective tube 1 may be used as the protective tube which is stored on the supply roll 38 and as is also described in connection with FIGS. 1 to 6. However, it is also possible to store an unslit protective tube, designated by reference numeral 1', on the supply roll 38 and to slit said protective tube 1' before its supply to the auxiliary tool 8 (or 8'), for instance, with a stationary knife 47 in longitudinal direction, as is shown with reference to detail "A" in FIG. 7. Such a knife 47 is disposed in the arrangement of FIG. 7 in the region of the cover element 39 and in front of the guide element 37, respectively.

The arrangement, as shown in FIG. 7, is distinguished by its mobility and small structural size, so that it can be easily mounted at the place of installation. It is clear that further rolls may be arranged on the rack 45, for instance for different cables and lines which are to be introduced into the protective tube 1; moreover, the racks 45 and 46 are not restricted to the shape as shown.

There has thus been shown and described a novel protective tube and an associated auxiliary tool which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A protective tube which is slit in a longitudinal direction, said tube including a closing element that maintains the longitudinal edges along the slit on a plane relative to one another, the improvement wherein the closing element is a separate profiled piece having, in cross-section, a central web inserted in the slit between the longitudinal edges of the tube, interconnecting an upper surface element covering an upper edge portion on an outer side of the tube along said longitudinal edges and a lower surface element supporting a region inside the tube along said longitudinal edges.

2. The protective tube according to claim 1, wherein the closing element, when viewed in cross section, is an "I" shaped profile piece with the central web thereof inserted in the slit between the longitudinal edges, and wherein the upper side of the tube is covered along the longitudinal edges on either side of the slit by respective upper surface elements of the profiled piece, and the inside of the tube is supported along the longitudinal edges on either side of the slit by respective lower surface elements of the profiled piece.

3. The protective tube according to claim 1, wherein the closing element, when viewed in cross section, is a profile piece having two bead-shaped members that are interconnected by the central web, with said central web inserted in the slit between the longitudinal edges; and wherein the upper side of the tube is covered along the longitudinal edges by one bead-shaped member of the profiled piece and the inside of the tube is supported along the longitudinal edges by the other bead-shaped member of the profiled piece.

4. The protective tube according to claim 2, wherein the lower surface elements of the profiled piece positioned on the inside of the protective tube have a curvature, in cross-section, with a radius of curvature which is approximately identical with the radius of curvature of the inside of the protective tube.

5. The protective tube according to claim 2, wherein the lower and upper surface elements of the profiled piece positioned on the inside and outside of the protective tube, respectively, have a curvature, in cross-section, with a radius of curvature which is approximately identical with the radius of curvature of the inside and outside of the protective tube, respectively.

6. The protective tube according to claim 2, wherein the upper surface elements of the profiled piece positioned on the outside of the protective tube are configured, in cross-section, as straight surface members.

7. The protective tube according to claim 2, wherein the upper surface elements of the profiled piece positioned on the outside of the protective tube have a curvature, in cross-section, with a radius of curvature which is approximately identical with the radius of curvature of the outside of the protective tube.

8. The protective tube according to claim 1, wherein the closing element is made from a flexible plastic material.

9. The protective tube according to claim 1, wherein the closing element is made from a material selected from the group consisting of polyurethane (PU), polypropylene (PP), polyethylene (PE) and polyvinylchloride (PVC).

10. An auxiliary tool for a protective tube which is slit in the longitudinal direction, to spread the longitudinal edges of such a protective tube along the slit and to close them again in abutment with one another, the tool comprising two partial bodies which at their one longitudinal side are connected to a hinge member and between which a cavity or space is formed for guiding cables or lines, the partial bodies being configured to be opened and closed again along the hinge member, and further comprising guide members provided on the outer surfaces of the partial bodies, with which the auxiliary tool can be guided along the longitudinal edges in the region of the slit of the protective tube, the improvement wherein the guide members are arranged on the free longitudinal edges opposite the hinge member, and wherein the region of the cavity between the partial bodies has arranged therein guide elements which, viewed in a projection onto the outside of the partial bodies, extend from the one end of the partial bodies at an angle to the guide members on the outside of the partial bodies to an end approximately in the plane of said guide members at the other end of the partial bodies, whereby the guide elements are configured to guide a closing element into the slit of the protective tube.

11. The auxiliary tool according to claim 10, wherein the partial bodies in a top view have a triangular or an isosceles trapezoidal shape.

12. The auxiliary tool according to claim 11, wherein at the tapering end of the partial bodies the guide members and the guide elements end in a plane.

13. The auxiliary tool according to claim 10, wherein the guide members and guide elements are formed by webs.

14. The auxiliary tool according to claim 13, wherein each guide member includes at least two parallel webs, arranged such that a U-shaped trough is formed between them.

15. The auxiliary tool according to claim 10, wherein the guide members extend from the one end to the other of the partial bodies.

16. The auxiliary tool according to claim 10, wherein the guide elements are configured in the region of the cavity for guiding a closing element to be inserted between the longitudinal edges of the protective tube.

17. The auxiliary tool according to claim 16, wherein a web arranged on the inside of each partial body is of such a height that the free edges of the opposite webs abut on each other.

18. The auxiliary tool according to claim 16, wherein a web arranged on the inside of each partial body is of such a height that a space is formed between the free edges of the opposite webs.

19. The auxiliary tool according to claim 14, wherein the bottom surface of the U-shaped trough comprises wavelike projections on the outside of the partial bodies.

20. The auxiliary tool according to claim 10, wherein the hinge connecting the two partial bodies is configured as a film hinge.

21. The auxiliary tool according to claim 20, wherein the hinge is configured as a double film hinge.

22. An assemblage of parts comprising a protective tube, a closing element and an auxiliary tool according to claim 10.

23. The assemblage according to claim 22, wherein the auxiliary tool, a tube piece and a length of the closing element corresponding to the tube piece are packaged to form a sales unit.

24. The set assemblage according to claim 23, wherein the sales unit further includes operating instructions for handling the auxiliary tool.

25. An arrangement comprising (1) a protective tube supply and an auxiliary tool according to claim 10, wherein the auxiliary tool is fixedly mounted on a work platform and guide elements are arranged on the work platform to move a protective tube toward and away from the auxiliary tool, and (2) supply units at the inlet side of the auxiliary tool for protective tube, and for lines and the profiled piece to be introduced into the protective tube.

26. The arrangement according to claim 25, wherein the supply units are arranged one on top of the other such that the lines are supplied above the protective tube, and the profiled piece is supplied above the lines.

27. The arrangement according to claim 25, wherein the supply units are formed by supply rolls.

28. The arrangement according to claim 25, wherein at the outlet side of the work platform a take-up roll is arranged for the protective tube with the drawn-in lines.

29. The arrangement according to claim 25, wherein the supply units are held in racks.

30. The arrangement according to claim 25, wherein for the supply of a longitudinally slit protective tube, an unslit protective tube is used, which at the input side of the auxiliary tool is cut in the longitudinal direction by a slitting device.

31. The arrangement according to claim 30, wherein the slitting device is a stationary knife.

* * * * *